US008325720B2

(12) United States Patent
Gao et al.

(10) Patent No.: US 8,325,720 B2
(45) Date of Patent: Dec. 4, 2012

(54) SYSTEM AND METHOD FOR SIMULATING IP NETWORK ROUTING

(75) Inventors: Lingping Gao, Lexington, MA (US); Guangdong Liao, Mississauga (CA)

(73) Assignee: NETBRAIN Technologies, Inc, Burlington, MA (US)

( * ) Notice: Subject to any disclaimer, the term of this patent is extended or adjusted under 35 U.S.C. 154(b) by 770 days.

(21) Appl. No.: 12/505,461

(22) Filed: Jul. 17, 2009

(65) Prior Publication Data
US 2012/0209581 A1 Aug. 16, 2012

Related U.S. Application Data

(60) Provisional application No. 61/081,652, filed on Jul. 17, 2008.

(51) Int. Cl.
G06F 17/50 (2006.01)
H04L 12/56 (2006.01)

(52) U.S. Cl. ............... 370/389; 370/254; 703/13

(58) Field of Classification Search ........... 370/252, 370/254, 255, 256, 395.53, 401; 703/13
See application file for complete search history.

(56) References Cited

U.S. PATENT DOCUMENTS

| 6,614,893 | B1* | 9/2003 | Paiz ................ 379/112.01 |
| 7,050,813 | B1* | 5/2006 | Paiz ................ 455/446 |
| 2004/0193729 | A1* | 9/2004 | Saraph ............. 709/241 |
| 2005/0041676 | A1* | 2/2005 | Weinstein et al. ... 370/401 |
| 2005/0135360 | A1* | 6/2005 | Shin et al. ........ 370/389 |
| 2005/0169179 | A1* | 8/2005 | Antal et al. ....... 370/231 |
| 2006/0092940 | A1* | 5/2006 | Ansari et al. ..... 370/392 |

* cited by examiner

Primary Examiner — Brian D Nguyen
(74) Attorney, Agent, or Firm — Jie Tan

(57) ABSTRACT

Methods and systems for simulating IP networks. Routing Clusters are formed by grouping routers that are connected directly or indirectly and are running the same routing protocol. Routers that are configured to run more than one routing protocols became Border Routers for routing clusters based on these routing protocols. Routing tables are formed by flooding the routers inside the routing clusters and by flooding routes across routing links by redistribution command.

15 Claims, 7 Drawing Sheets

SYSTEM AND METHOD FOR SIMULATING IP NETWORK ROUTING

CROSS-REFERENCE

Priority is claimed from the U.S. Provisional Application 61/081,652, filed on Jul. 17, 2008, entirety of which is hereby incorporated by reference.

BACKGROUND

The present application relates to network management, and more particularly to the virtual network routing simulation.

Note that the points discussed below may reflect the hindsight gained from the disclosed inventions, and are not necessarily admitted to be prior art.

In modern information society networks are formed between various devices for rapid information exchange and services. Data exchange between devices and computers in the networks, whether the Internet, telecommunication networks, cable or wireless, often need to be routed between various of groups of servers and different groups of devices and computers, or different geometric locations, for efficient communication. Networks are commonly IP based wherein IP addresses are used to identify computers and devices in the network and data may be serialized into IP packets to be delivered between different IP destinations.

Routers are specialized computers used in this data networks to provide connectivity between remote computers and network segments. The IP Data or packet is routed from its source to its destination through a series of routers. The routers use the forward table or routing table to determine the next hop for the packet's destination (based on the destination IP address in the IP packet header). The routing table correlates the final destinations (usually grouped to be a subnet) to the next hop IP addresses.

In a simple network, static routes may be configured in routers to build the routing table. However, the present IP networks are increasingly becoming complex and intertwined and interloped, dynamic routing protocols are utilized to provide flexibility and to handle the increasing complexity.

The dynamic routing protocols may discover remote networks reachable in a network domain and dynamically associate the discovered networks with correct neighboring routers and therefore build up the routing tables dynamically for routers.

Network routing is the process of selecting paths in a network along which to send traffic, such as data packets in an IP network. For small networks, routing may be performed manually, by constructing routing tables prior to applying traffic to the network. Larger networks utilize dynamic routing, wherein routing tables are constructed automatically according to a routing protocol.

The most commonly implemented dynamic routing protocols include: Border Gateway Protocol (BGP), OSPF (Open Shortest Path First), RIP (Routing Information Protocol) and EIGRP (Enhanced Interior Gateway Routing Protocol) and others. Known routing algorithms include Distance Vector and Link-state. Different routing protocol may use different routing algorithms. For example the Link-state protocol Open Shortest Path First (OSPF) uses Dijkstra's algorithm to calculate the shortest path tree inside each network area.

Routers may be configured to run more than one of these routing protocols. Different hardware or software applications may have different configurations. One essential task of network professionals is to understand how a specific routing configuration change affects the routing table of a router.

For a middle size to large size of network wherein hundreds or thousands of routers may be needed for routing, it is quite difficult and expensive to figure out how one configuration change can affect the routing of data, and the efficiency of an application. Currently more than 75% of network outages are caused by the network configuration changes, which may shut down a network and cause millions of dollars of damages and losses.

Network simulation tools have been created to simulate traffic flows through networks in the virtual environment, to analyze many aspects of the network's operation, to increase reliability by simulating the effect of a network change, and ensure conformance with organizational policies and other rules regarding network operation.

A virtual network is a data structure comprising virtual features (nodes and links) that represent corresponding features in a physical network. Conventional network simulation includes creating a virtual network and simulating traffic flows through the virtual network according to predetermined routing protocols, to populate the virtual network nodes with routing and forwarding information such as forwarding tables. The virtual network may include virtual features that do not have an existing counterpart in an actual network. In either case, traffic flows may be simulated through the virtual network.

A variety of network analyses may be performed on any of these types of high-fidelity simulations using operational forwarding data, and reports may be generated based on the analyses. These reports provide network managers with valuable information on network operation. For example, reporting on forwarding tables themselves is critical to ensuring proper network behavior, e.g., that the proper default routes appear in the forwarding tables. Since a network node will drop a packet for which it has not entry in the forwarding table, maintaining default routes in each forwarding table is important to prevent excessive data loss and retransmission.

Due to the complexity of real world networks, complicated simulation models may be built from various calculations. It provides great advantages in efficiency to simplify the simulation in any conceptual way.

SUMMARY

The present application discloses new approaches to the network simulation.

The network is viewed to be composed of groups of logical routing clusters which are comprised of connected network devices or interfaces running the same routing protocols. Routers that run more than one routing protocols function as cluster links between routing clusters.

In one embodiment, Network Cluster Graphs (NCG) are built to simplify the routing table calculation inside a routing cluster and routing exchange between two routing clusters.

In one aspect, NCG based simulation methods calculate the simulated routing tables in two stages: first flood the routes inside a cluster following the principles of the corresponding routing protocols; then exchanges routes through cluster links, possibly triggering the other round of the route convergence inside routing clusters.

The disclosed innovations, in various embodiments, provide one or more of at least the following advantages. However, not all of these advantages result from every one of the innovations disclosed, and this list of advantages does not limit the various claimed inventions.

Each level of simulation is simplified by routing protocol simulation;

High efficiency for complicated traffic problem analysis.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

Figure 1:
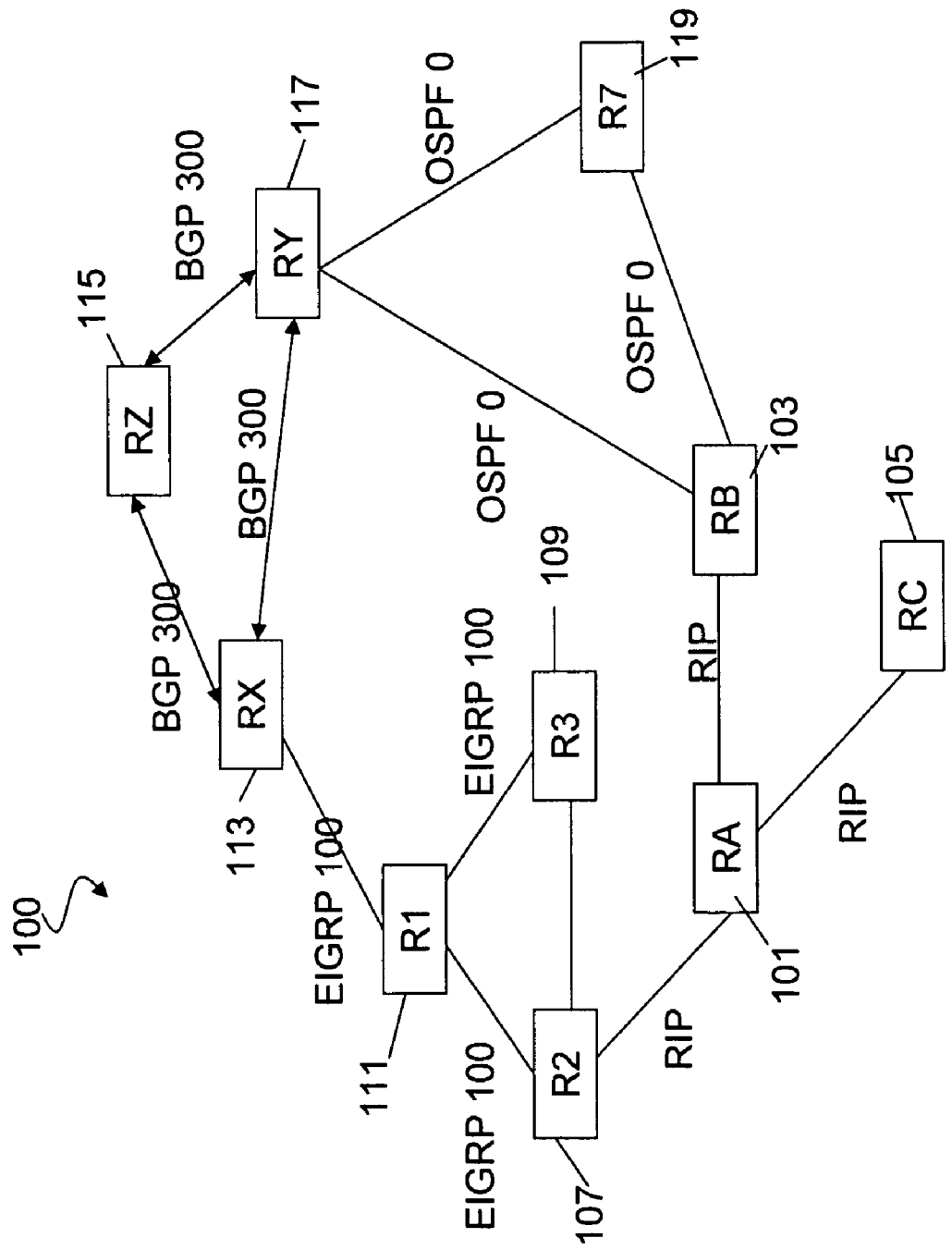
FIG. 1 schematically illustrates an example network to implement IP routing protocols.

The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

A particularly powerful tool for understanding network traffic behavior is graphic visualization. According to one embodiment, a graphical representation of the network may be output to a display screen, printer, plotter, or the like. The screen display may be zoomed and panned, as known in the art. Based on network traffic simulations utilizing operational forwarding data, the graphical display may be annotated with a variety of information. For example, visual depictions of traffic flows may illuminate how any given device in the network learns to reach a particular network address.

In the NCG simulation model, there are several major components. A Routing Cluster (RC) refers to a set of routers or router interfaces running the same routing protocol, and able to advertise the originated route entry to this routing protocol. A Router inside only a routing cluster is called as a cluster router (CR) to differentiate conceptually and logically from a physical router. A physical device can also belong to more than two routing clusters if they are configured to run more than one routing protocols.

Based on the underlining routing protocols, for example the currently most commonly used routing protocols, five types of routing clusters may be defined: RIP RC, wherein all connected router interfaces run RIP protocol; (E)IGRP RC, wherein all connected interfaces run (E)IGRP protocol and have the same process number; OSPF RC, wherein all connected router interfaces run OSPF routing protocol and in the same area; BGP RC, wherein all routers have the same BGP AS number.

For a given routing protocol, there can be more than one associated RCs. For example, there can be two RIP RCs that are physically separated by another RC. For RIP, OPSF and (E)IGRP based Routing Clusters, routers in the clusters are interface based whereas BGP RCs are based on their router BGP autonomous system (AS) numbers. Therefore a physical device can also belong to more than two routing clusters if they run more than one interfaces and have more than one BGP AS numbers. To illustrate these logic relations, a router inside a routing cluster, i.e. cluster router, of a NCG simulation, is conceptually and logically different from a physical router.

A Border Cluster Router (BCR) refers to a cluster router that is able to redistribute the route entries originated from a routing cluster into another routing cluster. Based on the underlining routing protocols, for example the currently most commonly used routing protocols, five types of BCR may be defined: (1) the router having redistribution command; (2) OSPF area border router; (3) EBGP router; (4) the router running the same process id IGRP and EIGPR; (5) a router running BGP and IGP and also BGP having network commands which leads to IGP route injected to BGP. With the exception to an EBGP router, a physical router that is one type of BCR may also be other types of BCRs.

A Cluster Link (CL) refers to a logic link between two BCRs. Depending on the BCR type, the cluster link presents the redistribution between two routing protocols, OSPF LSA exchanges between the backbone area and other areas, EGBP router neighbor relationships, the route exchanges between the same processed of IGRP and EIGPR or BGP network commands.

Since a Cluster Link has directions, it is preferably implemented as a vector.

Network Cluster Graph (NCG) refers to graphs that model and simulate a network using RC, BCR and CL as logic components. A NCG can represent a network topology at high level by ignoring all cluster routers that only belong to one RC. It is largely similar to a normal network topology if a RC represents a device, a BCR represents an interface and CL represents as a link between the interfaces. However a NCG is a vector diagram that has directions while the normal network topology map is not.

In reference to FIG. 1, it illustrates an example network 100 running dynamic IP routing protocols RIP, EIGRP 100, BGP 300, and OSPF area 0.

Routers RA 101, RB 103 and RC 105 are configured to implement routing protocol RIP. Routers R1 111, R2 107 and R3 109 are configured to implement routing protocol EIGRP 100. Routers RX 113, RY 117 and RZ 115 are configured to be BGP 300 neighbors. Routers RY 117, R7 119 and RB 103 are also configured to implement OSPF area 0.

In one embodiment, when a router is configured to run more than one routing protocols, this router can be configured to exchange the routes between these routing protocols. For example, router RB 103 is configured to run both RIP and OSPF area 0, the following command may be used to redistribute routes learned from RIP to OSPF area 0:

```
! router RB redistribution configuration
router ospf 0
redistribute rip subnets metric 50
```

Figure 2:
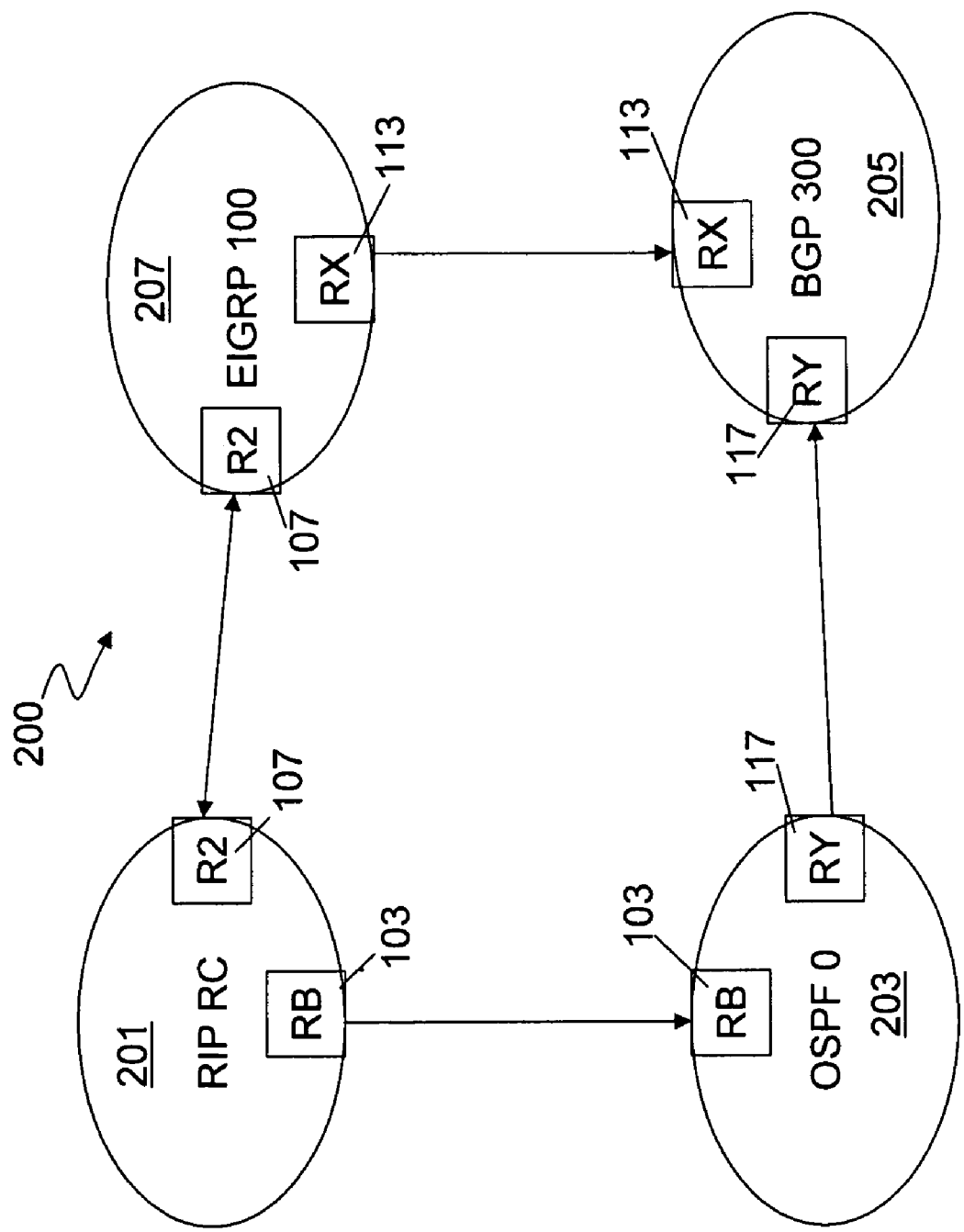
FIG. 2 schematically illustrates an example of Network Cluster Graph.

For the network shown in FIG. 1, a sample NCG 200 may be built in accordance with the method disclosed in this application. As shown in FIG. 2, four RCs may be formed in this graph: RIP Routing Cluster 201, OSPF 0 Routing Cluster 203, EIGRP 100 Routing Cluster 207 and BGP 300 Routing Cluster 205.

The routers that only run in one routing protocol belong to only one RC will be omitted in the NCG graph. For example, routers RA 101 and RC 105 in FIG. 1 belongs only to RIP RC and they are not drawn in the graph. However, the four BCRs in FIG. 1, the R2 107, RB 103, RX 113 and RY 117 are drawn separately for each router cluster they belong to. Cluster Links therefore exist and are drawn between these border routers. For example, the cluster link 209 from RIP to OSPF0 presents the route redistribution from RIP to OSPF 0. The corresponding configuration of router RB 103 may be the following:

```
! router R3 redistribution configuration
router ospf 1
redistribute rip subnets metric
```

The cluster link 211 from EIGRP 100 routing cluster 207 to BGP 300 routing cluster 205 presents EIGRP route injection into BGP 300 at BCR RX 113. IGP routes may be injected into BGP through redistribute or network commands.

NCG 200 therefore by omitting the routers in one cluster provides a high level, and more logic and clear view of the network 100 from the perspective of IP routing. This greatly simplifies the system and helps the network professionals to understand and make change on the network.

Dynamic routing protocols dynamically construct routing tables during a network learning process. The routing tables, maintained at network router nodes, include routes through the network to network destinations, which may be stored, for example, as network addresses (e.g., IP addresses). The routing tables may also include metrics associated with the routes, which may include bandwidth, delay, hop count, path cost, load, Maximum Transmission Unit (MTU), reliability, cost, and the like. Depending on the routing protocol, the routing table includes the entire network topology (link-state) or partial topology, such as the shortest paths to known destinations via all of its neighbors (distance vector).

Figure 3:
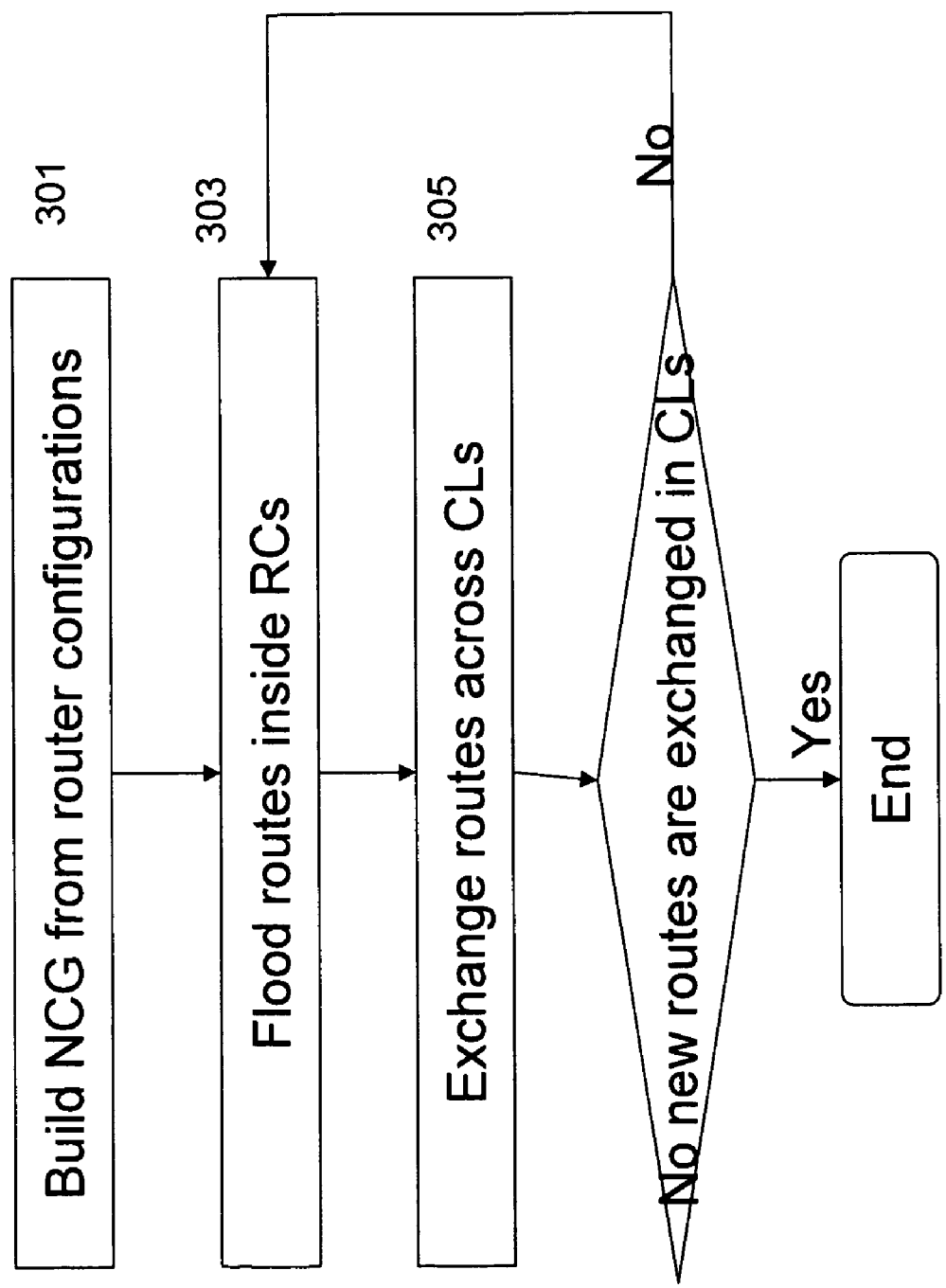
FIG. 3 illustrates the high level diagram flow to run the simulation based on Network Cluster Graph.

Based on the NCG 200, the simulated routing table may be calculated through the following process as shown in FIG. 3.

Four high level steps and two stages are implemented for a simulation. For example for network 100, first at step 301, the simulation builds a NCG 200 from router configuration files extracted from the physical network 100. Routers are clustered according to current running routing protocols. After forming the NCG, at step 303 flood routes inside each Routing Cluster and exchange routes across cluster links (step 305). Repeat step 303 to 305 if there are still new routes that can be exchanged across cluster links. Simulation ends if no more new routes exchanged at cluster links.

To build a NCG for a physical network using router configurations, the system first parses the configurations of IP interfaces and routing protocols to build the network topology shown in FIG. 1. If the IP addresses of two interfaces fall into the same subnet, then the system defines that these two interfaces are connected and the corresponding routers are connected routers. Further by looking into the routing protocol configurations on the routers, such as network commands, the system identify the types and categories of the routing protocols running on the interfaces.

Then the system began the process of creating individual IP islands. Starting from a router, the system identifies the running routing protocols and extend the process to all of its neighbors. This process is recursively repeated and extends to neighbors of neighbors until no new neighbor is found. Within each individual IP island, all devices are connected together directly or indirectly. In an ideal situation all network devices are connected together only one IP island is formed in one network. However in reality, due to misconfigurations or other reasons, a network can have more than one IP islands. And the routes can be only flooded inside an IP island since there is not connection between different IP islands.

Then system began to create routing clusters within an IP island. Routers that are configured to run the same routing protocol form one routing cluster. If a router is configured to run more than one routing protocols, this router belongs to more than one routing clusters (RCs). The routing protocols may be identified by the protocol type plus other identification factors if necessary. For example, EIGRP 300 and EIGRP 400 are treated as two different routing protocols, and BGP 1000 and BGP 3000 are also treated as two different protocols. A router in a routing cluster is therefore not the same as the physical router, and a router inside a RC is therefore called a Cluster Router (CR) in order to differentiate with the physical router.

Therefore if all routers are configured to run only one routing protocol, then the system will create one RC. If at least one router is configured to run two routing protocols, the system will create two RCs and this router belongs to both of the Routing Clusters.

In one embodiment, the first step to create RCs in an IP island is to create CRs for all routers in this island based on the router configurations for routing protocols. For example, two cluster routers are created for router RX in FIG. 1 and these two cluster routers belongs to CR EIGRP 300 and CR BGP 300.

Then all cluster routers belonging to the same routing protocols are collected into a bucket. For example, all cluster routers configured to run RIP are put together.

In this bucket routing clusters (RCs) may be further formed. A RC is composed of cluster routers which are configured to run the same routing protocols and connected together by interfaces to run the same routing protocol, thus they are not separated by the other RCs. Cluster routers in the bucket may fall into more than one RC.

The algorithm to create RCs from the bucket is similar to the algorithm to create an IP island: by staring from one router, and extending the process to its cluster neighbors by identifying the routers that are directly connected by the interface and that run the same routing protocol. This process is recursively extended to the neighbors of a neighbor until no new neighbors are found. All these neighbors belong to a CR and form a RC.

The system then further checks every router which belongs to more than one CRs to see whether the router can redistribute a route from one CR to another CR. If the router can distribute a route from one CR to another CR, this router is identified as a BCR, it belongs to both CRs as a BCR and a CL is created between the two BCRs of the same router.

Figure 4:
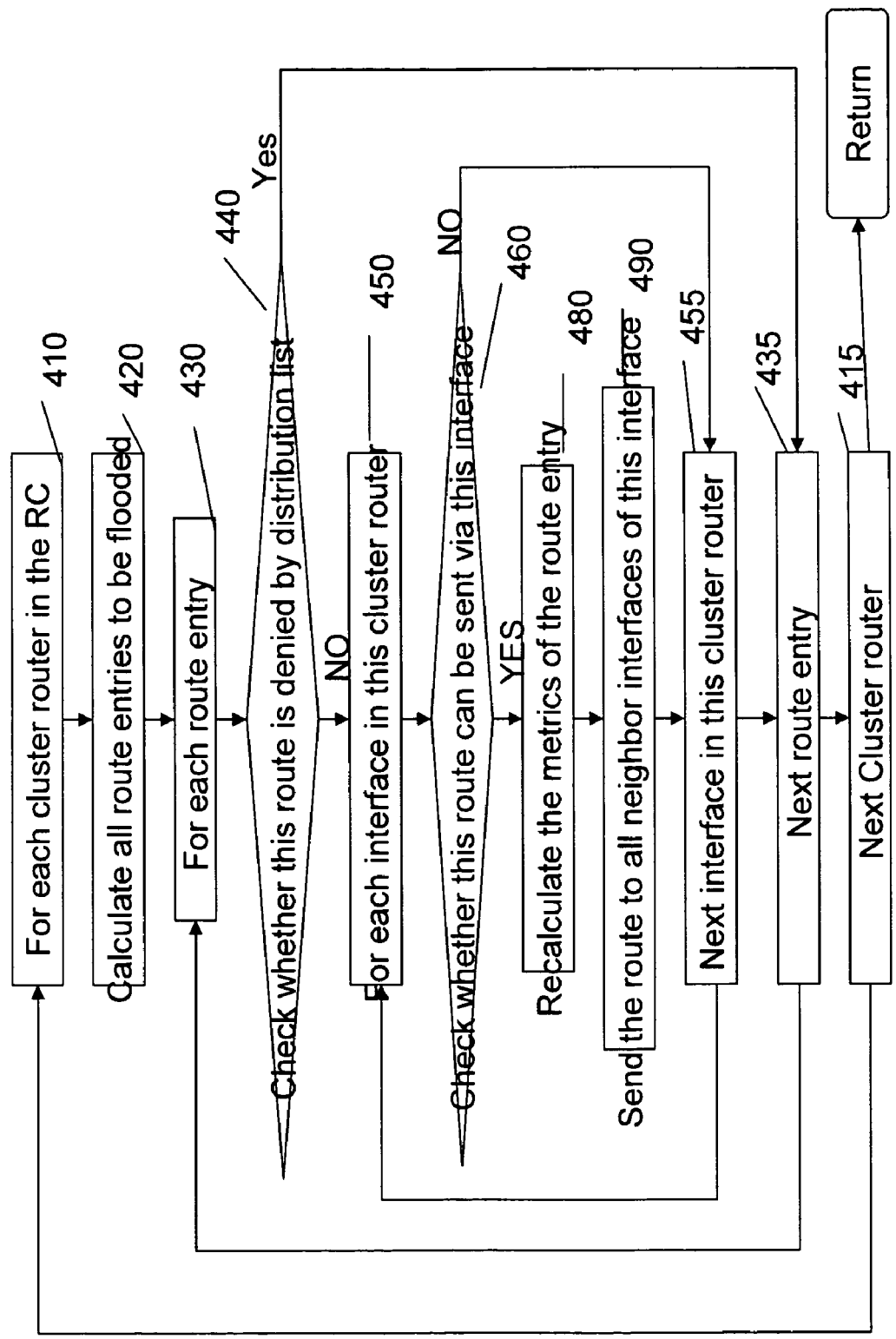
FIG. 4 shows an example flow for the route flooding inside a routing cluster.

FIG. 4 shows an example process for the route flooding inside a RC in one embodiment. From step 410 to step 415, the system loops through each cluster router in the RC, and exits the flooding process when all cluster router are processed.

For each one specific cluster router, the system first calculates all route entries (step 420). The system extracts the route entries from several sources: (1) the directly connected route, for example, the primary IP address of the router interface.

For example, inside a RC EIGRP 1000, assuming that the following commands are configured in the router under calculation:

```
interface Ethernet 0
    ip address 192.168.1.1 255.255.255.0
router eigrp 1000
    network 192.168.1.0
```

The directly connected route with destination subnet 192.168.1.0/24 will be flooded for this router.

(2) The static route will be flooded if the destination IP address of the static route is covered by the network command under the routing protocols.

For example, assuming that the following commands are configured in a cluster router.

```
interface Ethernet 0
    ip address 192.168.1.1 255.255.255.0
router eigrp 1000
    network 192.168.1.0
    network 66.0.0.0
ip route 66.66.66.0 255.255.255.0 Ethernet0
```

The static route 66.66.66.0 will be extracted and will be in the EIGRP routing table and flooded through the RC.

(3) All directly connected routes will be sources to be flooded if redistribute connected command is configured in this cluster router; (4) some static routes will be sources to be flooded if the redistribute static command is configured in this cluster router.

After extracting the information of all route entries, at step 430, the system loops through every route entries to check whether each of the route entry is denied by distribution list in the router's configuration. The distribute list command configured under the routing protocol generally uses an ACL list to block some routes to be flooded. If the route is denied by the distribute list, the system moves on to the next route entry.

If the route entry is not denied by the distribute list in the router's configuration, at step 450, the system loops through every interfaces of this cluster router to first check whether this route can be sent out from this interface. If no, then the system goes to the next interface. If yes, the system recalculates the route metrics and adds this interface cost into the metrics at step 480 and send the route entry to all neighbor interfaces connected to this interface (step 490).

In checking whether the route can be sent from each of configured interfaces, a route may be denied by the ACL commands and distribute list configured under this interface. Also for the classful routing protocols such as RIP, the interface may not broadcast this route in some condition. And for the distance vector routing protocols such as RIP, the split horizon rule can also forbid sending out the route.

Figure 5:
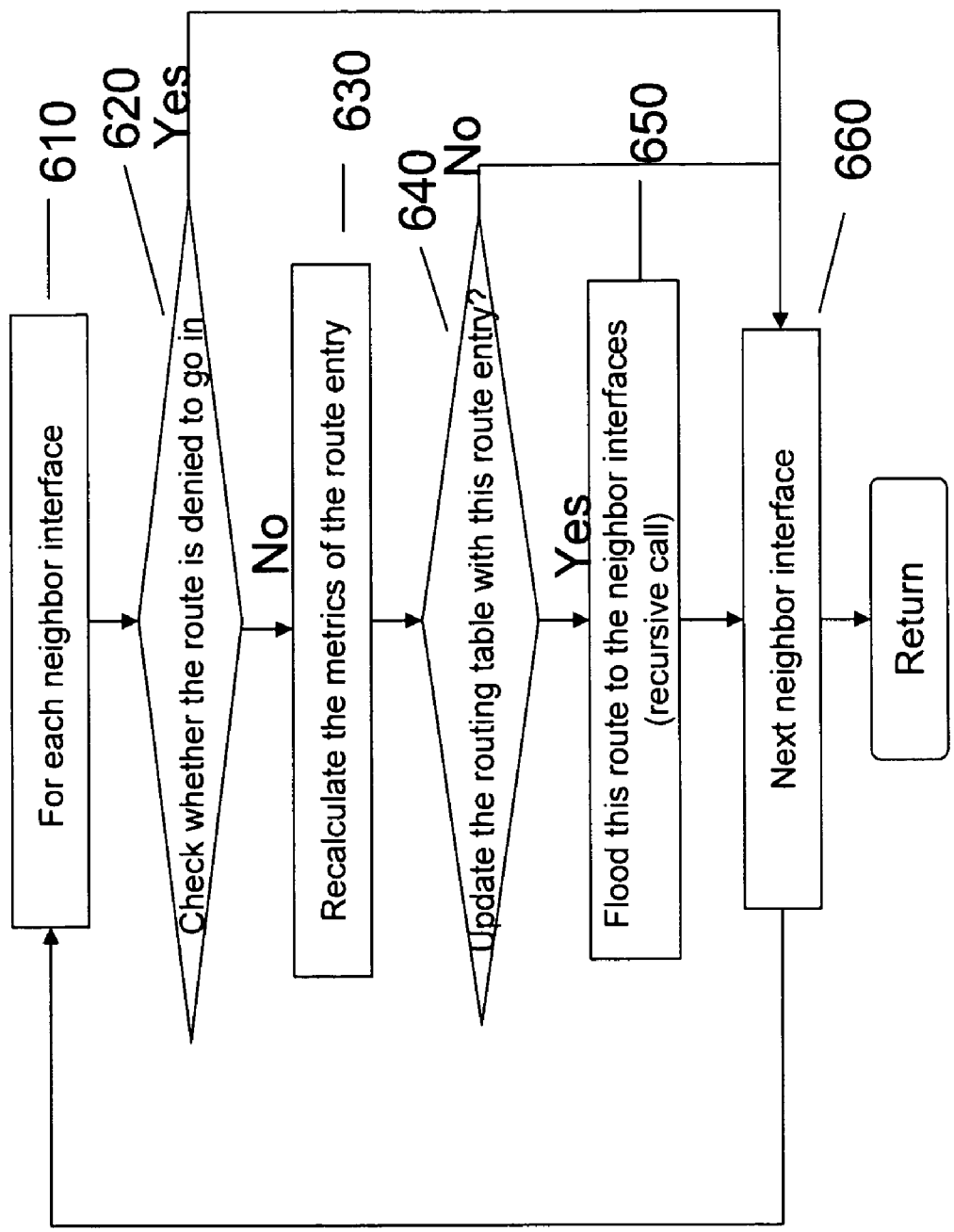
FIG. 5 shows an example process flow chart for neighbor routing clusters to update a route.

FIG. 5 illustrates an example process for the step of 490 to send a route to all neighbor interfaces of the present interface. At step 610, the system will loop through each of the neighbor interfaces of this interface. At step 620, the system verifies whether the route can be accepted by the present neighbor interface. Instead of checking the outbound traffic as in step 460 of FIG. 4, this time is to check the inbound traffic. If the route is not accepted by the neighbor interface, then the system moves on to the next neighbor interface.

If the route is accepted by the neighbor interface, at the step 630, the interface cost will be added into the route metrics, and at step 640, the route table of the cluster router that this neighbor interface belongs to will be updated by the route entry. However, if there is already a better route entry for the same destination subnet than this route entry, the route table will not be updated and the input route entry will be discarded.

After the route flooding is done for all RCs, all new or updated route entries in the BCRs are distributed through CLs. The algorithm to distribute routes through a CL varies for different types of CLs. In one embodiment, there are about four different types of CLs: (1) redistribution CL: two clusters redistribute routes via redistribution command; (2) OSPF area CL: two OSPF clusters (different area numbers) distribute routes; (3) IGRP EIGRP CL: a router to run IGRP and EIGPR routing protocol distribute routes freely; (4) BGP CL: routes from other routing protocol can be injected into BGP routing table either through network command or other methods.

Figure 6A:
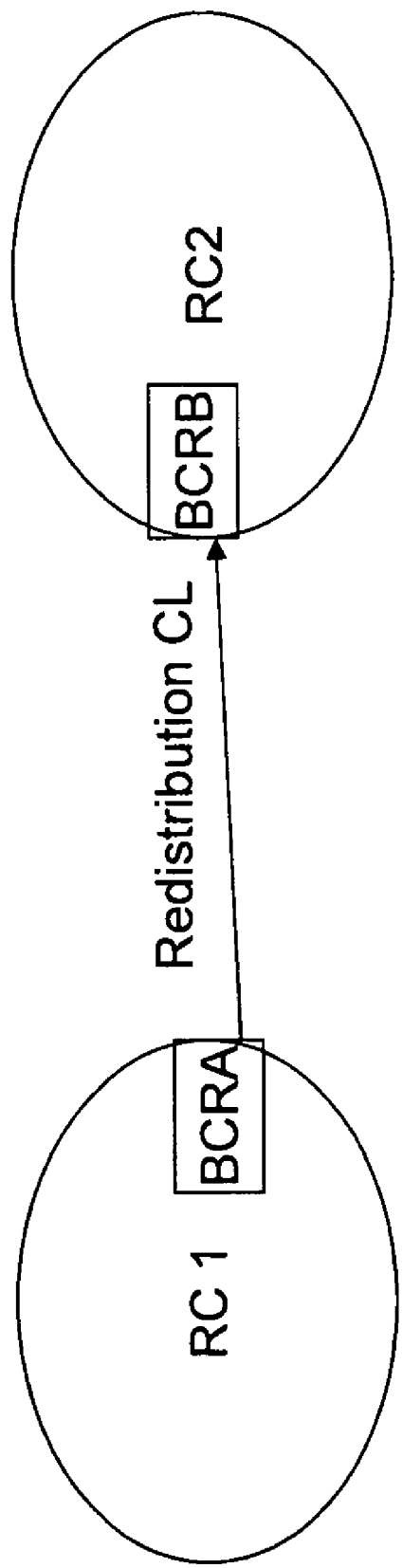
FIGS. 6A and 6B show an example process flow for distributing routes from a BCR (BCR A) to another BCR (BCR B) via a redistribution Cluster Link.
Figure 6B:
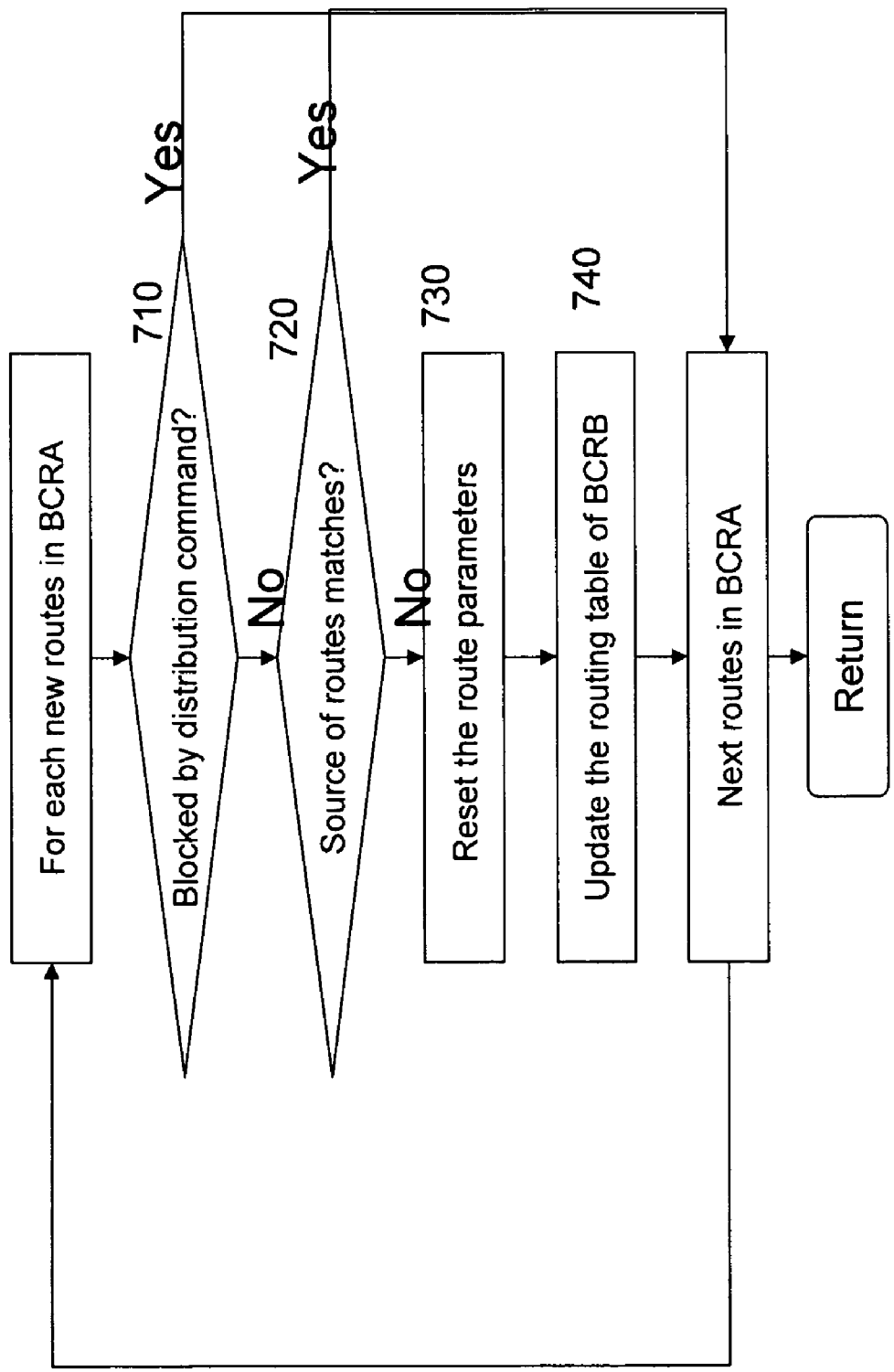

FIGS. 6A and 6B show an example process for distributing routes from a BCR (BCR A) to another BCR (BCR B) via a redistribution CL.

For each new or updated route at BCR A, the system checks whether this route is blocked by the distribution or route map command configured in redistribution command for this CL (step 710). If yes, the route is not distributed through CL. If no, the method checks whether the source routing protocol matches the redistribution command (step 720). If not, then the route is not distributed. Otherwise the method will reset the route parameters according to redistribution command and update the routing table of BCR B (steps 730-740). If the route is better than the route of the same destination subnet in the routing table, this route will be updated to the routing table and in the next round of flooding inside RC2, this route will be flooded through all cluster routers in RC2.

The simulated routing tables calculated from the router configurations may be different from the actual routing tables because the live device or interface may be down, while the simulation only simulates the situations of operating state. If an interface is down in the live network, the route entries originated from this interface may not exist in the live network. Also the network protocol may not be supported. Other parameters of the network may be used to test whether the simulated routing table matches with the physical network. A method described in US Patent Publication US 2007/0025355 A1 may be applied to identify and correct any differences, therefore the entirety of this application is incorporated by reference.

The simulations are executed on a computer operative to execute one or more computer programs implementing the NCG simulation. The computer includes a processor, which may comprise a general purpose microprocessor, a digital signal processor, or custom hardware such as an FPGA or ASIC. The processor is operatively connected in data flow relationship with memory. The memory includes, at least during its execution, a NCG simulation software operative to perform some or all of the methods of FIGS. 1-6.

A non-volatile copy of the software may reside on a fixed disk drive. The software implementing NCG simulation may be initially loaded into the computer from a computer readable medium, such as a CD-ROM or DVD, via a removable media drive. The computer preferably includes a user interface, comprising a keyboard, pointing device, and the like, and a graphic display operative to display a graphical representation of a virtual network environment, annotated with information derived from a high-fidelity NCG simulation using operational forwarding data. The graphic representation and/or reports of network simulation analyses may be output to a printer, plotter (not shown), or other hard copy peripheral as known in the art. An input/output (I/O) interface connects via a wired or wireless data channel to a physical network. Operational route data are extracted from the configuration files of network devices in the physical network, and applied by the NCG software to cluster routers in the virtual network environment prior to network traffic simulation.

Although depicted as software executing on a general-purpose computer, implementations of the disclosed method are not limited to this embodiment. In general, the method may be performed by any means known in the art, including any combination of software, dedicated hardware, firmware, or the like.

According to various embodiments, there is provided: a method for simulating a network routing, comprising the actions of: building a Network Cluster Graph (NCG) based on the network configuration information, wherein the NCG comprises at least one routing cluster; and calculating simulated routing tables for the network using the NCG.

According to various embodiments, there is provided: a method for simulating a network routing, comprising the actions of: extracting first configuration information including routing protocols from a network device; identifying and extracting configuration information of neighboring network devices of said network device using the first configuration information; building at least one routing cluster (RC) wherein the network devices that run the same routing protocol are grouped in one cluster; identifying a border cluster router (BCR), if any, that is configured to run at least two routing protocols; If there is border cluster router, linking the routing clusters which said border cluster router belongs to via said border cluster router; and displaying the routing clusters.

According to various embodiments, there is provided: a method for simulating a network routing, comprising the actions of: calculating route entries for a cluster router; determining whether each of the route entries can be updated to the neighbor devices by at least one of the interfaces of the router; and updating the metrics of each of the route entries.

According to various embodiments, there is provided: a method for simulating a network routing, comprising the actions of: calculating route entries for a cluster router; determining the neighbor interfaces for the interface of cluster router; determining whether each of the route entries may be denied by any of the neighbor interfaces; and updating the routing table of each of the route entries, wherein the network is an IP network, the neighboring devices are determined by the IP address of each of the devices.

According to various embodiments, there is provided: a method for simulating a network routing, comprising the actions of: flooding the routes from one router cluster to another router cluster via a border cluster router wherein flooding routes across a router cluster further comprising: determining whether a route is blocked by the distribution command in the configuration of the boarder cluster router.

According to various embodiments, there is provided: a method for simulating a network routing, comprising the actions of: determining whether the source routing protocol matches the redistribution command of the boarder cluster router; and if yes for the above step, the routing table of the boarder cluster router is updated and the route parameters are reset according to the redistribution command, wherein the NCG is a vector diagram.

According to various embodiments, there is provided: a method for simulating a network routing, comprising the actions of: building a Network Cluster Graph (NCG) wherein the network comprises plurality of routing clusters; each of the routing clusters has plurality of border cluster routers; border cluster routers are linked with a directional cluster link; and calculating simulated routing tables for the network using said NCG wherein the routers in the routing cluster are directly or indirectly connected and flooding the routes from one router cluster to another router cluster via a border cluster router wherein the connected router interfaces inside at least one routing cluster run RIP protocol, and wherein the connected router interfaces inside at least one routing cluster run (E)IGRP protocol and wherein the connected router interfaces inside at least one routing cluster run OSPF protocol and in the same area and wherein the connected routers inside at least one routing cluster have the same BGP AS number, and wherein at least one border cluster router interface run simultaneously at least two routing protocols selected from a group comprised of RIP protocol, (E)IGRP protocol, OSPF protocol, and BGP protocol.

According to various embodiments, there is provided: A network simulation system, comprising: a screen for displaying network simulation; and a computer system for extracting and processing network device information from a physical network; wherein the screen displays a dynamically generated simulation of the physical network in which network devices that are connected directly or indirectly and are running one same routing protocol are grouped to be in one router cluster; routers running more than one routing protocols are border routers that form cluster links between two router clusters, wherein the computer system further conducts the actions of: calculating route entries for a cluster router; determining whether each of the route entries may be updated to the neighbor devices by at least one of the interfaces of the router; and updating the metrics of each of the route entries.

According to various embodiments, there is provided: a network simulation system, comprising: a computer system that further conducts the actions of: calculating route entries for a cluster router; determining the neighbor interfaces for the interface of cluster router; determining whether each of the route entries may be denied by any of the neighbor interfaces; and updating the routing table of each of the route entries and flooding the routes from one router cluster to another router cluster via a border cluster router and determining whether a route is blocked by the distribution command in the configuration of the boarder cluster router; and wherein whether a network device is a neighboring device to another network device is determined by the IP addresses of each of the devices.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for simulating a network routing by a computer processor, the method steps performed by the computer processor comprising the actions of:
    building a Network Cluster Graph (NCG) based on a set of configuration information of a network, wherein the NCG comprises at least one routing cluster having a plurality of network devices; and
    calculating at least one simulated routing table for the network using the NCG;
    extracting a first configuration information including routing protocols from a first network device;
    identifying and extracting a second configuration information of at least one neighboring network device of said first network device using the first configuration information;
    building at least one routing cluster (RC) wherein a set of network devices that run a same routing protocol are grouped in one cluster;
    identifying a border cluster router (BCR), if any, that is configured to run at least two routing protocols;
    upon the identified border cluster router, identifying a second set of routing clusters in which said border cluster belongs to;
    linking the second set of routing clusters in which said border cluster router belongs to via said border cluster router; and
    displaying the second set of routing clusters on a screen device.

2. The method of claim 1, further comprising actions of:
    calculating a set of route entries for a cluster router, each said route entry having a metrics;
    determining whether each of the set of route entries can be updated to a neighboring network device; and
    updating the metrics of each of the route entries.

3. A method of claim 1, further comprising actions of:
    calculating a set of route entries for a cluster router having at least one interface;
    determining a neighboring interface for said interface of the cluster router;
    determining whether each of the set of route entries may be denied by the neighboring interface; and
    updating each of the set of route entries in the routing table of the cluster router.

4. The method of claim 1, wherein the network is an IP network.

5. The method of claim 1, wherein the neighboring devices are determined by an IP address of each of the devices.

6. The method of claim 1, further comprising actions of:
    flooding a route from one router cluster to another router cluster via a border cluster router.

7. The method of claim 6, wherein flooding a route from one router cluster to another router cluster further comprising:
    determining whether a route is blocked by a distribution command in a configuration of the border cluster router.

8. The method of claim 6, wherein flooding a route from one router cluster to another router cluster further comprising:
    determining whether a source routing protocol matches a redistribution command of the border cluster router; and
    if yes for the above step, updating the routing table of the border cluster router and resetting a set of route parameters according to the redistribution command.

9. A network simulation system, comprising:
    a screen for displaying network simulation; and
    a computer system for extracting and processing a plurality of network device information from a physical network;
    wherein the screen displays a dynamically generated simulation of the physical network in which a plurality of network devices that are connected directly or indirectly and are running on a same routing protocol are grouped to be in a same router cluster; and a router running more than one routing protocols is a border router that forms a cluster link between two router clusters.

10. The network simulation system of claim 9, wherein the computer system further conducts the actions of:
    calculating a plurality of route entries for a cluster router that has a set of routes wherein each of the route entries has a metrics;
    determining whether each of the route entries may be updated to a neighboring device by at least one interface of the router; and
    updating the metrics of each of the route entries.

11. The network simulation system of claim 9, wherein the computer system further conducts the actions of:
    calculating a plurality of route entries in a routing table for a cluster router having at least one interface;
    determining a neighboring interface for the interface of the cluster router;
    determining whether each of the route entries may be denied by the neighbor interface; and
    updating each of the route entries in the routing table of the cluster router.

12. The network simulation system of claim 9, wherein the computer system further conducts the actions of:
    flooding a set of route entries from one router cluster to another router cluster via a border cluster router.

13. The network simulation system of claim 9, wherein the computer system further conducts the actions of:
    determining whether a route is blocked by a distribution command in the configuration of the border cluster router.

14. The network simulation system of claim 9, wherein the network is an IP network.

15. The network simulation system of claim 9, wherein whether a network device is a neighboring device to another network device is determined by an IP address of each of the devices.

* * * * *